Feb. 15, 1966   R. E. CHURCH   3,235,207
MOTOR MOUNTING ARRANGEMENT
Filed May 25, 1964   3 Sheets-Sheet 1
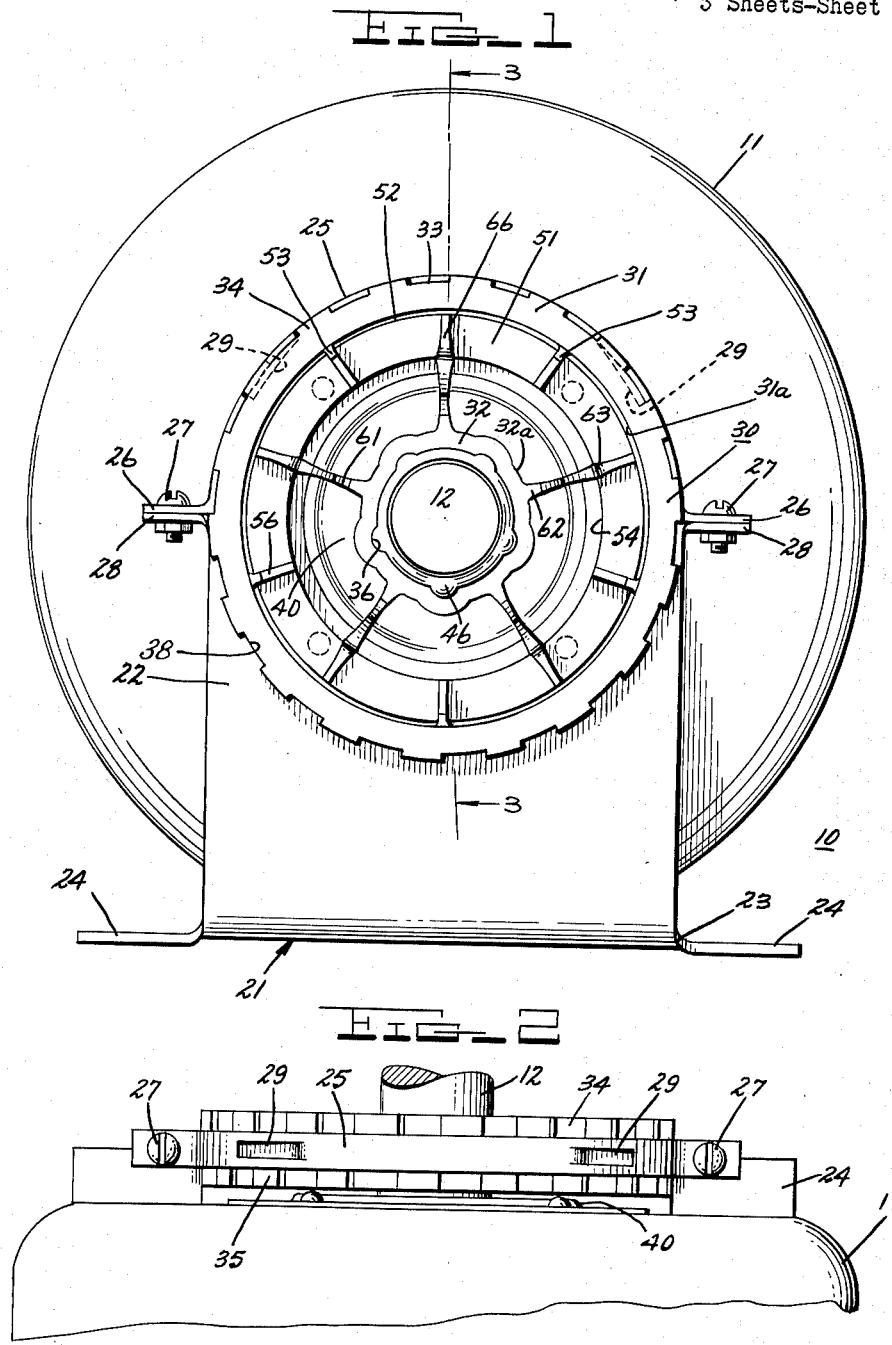
INVENTOR.
Ralph E. Church,
BY John M. Stoudt
Attorney.

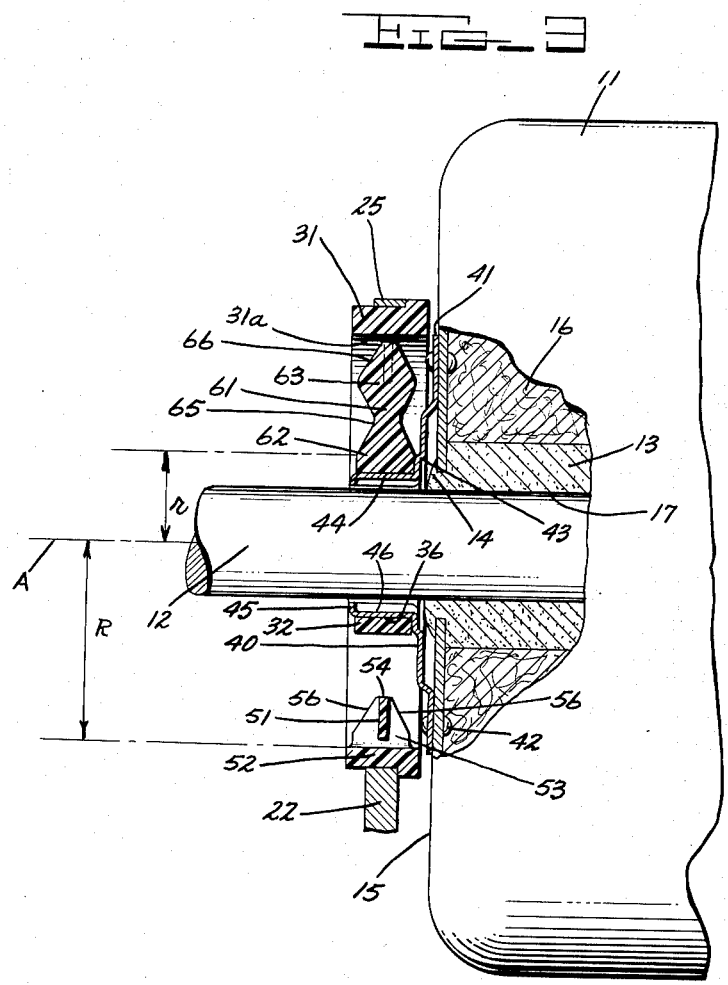

Feb. 15, 1966 R. E. CHURCH 3,235,207
MOTOR MOUNTING ARRANGEMENT

Filed May 25, 1964 3 Sheets-Sheet 3

INVENTOR.
Ralph E. Church,
BY John M. Stoudt
Attorney.

United States Patent Office 3,235,207
Patented Feb. 15, 1966

3,235,207
MOTOR MOUNTING ARRANGEMENT
Ralph Edward Church, Fort Wayne, Ind., assignor to General Electric Company, a corporation of New York
Filed May 25, 1964, Ser. No. 370,758
10 Claims. (Cl. 248—26)

This application is a continuation-in-part of my copending application Serial No. 327,299, filed December 2, 1963, now abandoned.

This invention relates in general to an improved motor mounting arrangement and more particularly to an improved vibration isolating resilient mounting construction for supporting electric motors and the like which reduces the transmission of vibration and noise producing forces to its stationary supporting structure.

In the construction and support of small dynamo-electric machines, it is very desirable, if not essential, that operational noises and vibrations be kept as low as possible. This is especially true for small electric motors intended for domestic and office use, as in washing machines, fans, electric typewriters, and similar appliances and office equipment. For example, these motors normally include a motor frame supporting a rotor and stator for relative rotation, the frame in turn being supported on a stationary structure, such as a mounting base or the like. One very troublesome source of noise and vibration are the pulsating torques having their origin in the magnitude of the flux generated in a standard 60 cycle alternating current motor which changes 120 times per second. Since there is a reaction in the motor stator and rotor in response to each change in flux magnitude, this reaction will ultimately be translated into vibrations of the motor frame. Consequently, for these and other reasons, such as forces originating from the weight of the motor and the load driven by the motor, the mounting connection between the frame and the stationary supporting structure will be subjected to a combination of torsional, axial, and radial stresses. In the past, these stresses, and especially the torsional stress and the radial stress created, in part, by radial shaft loading, have shortened the life and effectiveness of the mounting.

In view of these factors and considerations, there has been a practical difficulty in providing a satisfactory yet relatively inexpensive arrangement which is capable of limiting to an acceptable level the transmission of vibration and noise producing forces from the motor frame to its supporting structure for long periods of time. In addition, further difficulty has been experienced in providing a satisfactory vibration and noise isolating arrangement which is also economical to manufacture and install on the motor and easy to maintain.

Accordingly, it is the primary object of this invention to provide an improved mounting arrangement for effectively limiting the transmission of vibration and noise producing forces from a dynamoelectric machine during operation to the supporting structure which carries it, and it is a more specific object to provide an improved mounting construction having the desirable qualities enumerated above.

It is yet another object of the present invention to provide an improved yet relatively inexpensive mounting construction for damping out or isolating vibrations of the motor frame which is especially effective in preventing the transmission of torsional stresses to the supporting structure for the frame and provides adequate rigidity against radial loading.

It is a further object of the invention to provide an improved and low cost mounting arrangement for support of a dynamoelectric machine having a construction which tends to prevent damage to the mounting member from sudden impact loads imparted to it.

In carrying out the objects of the present invention in one form thereof, I provide an improved mounting arrangement especially effective in reducing the transmission of vibration and noise producing forces such as pulsating torques and axial forces, to the stationary support. At least one motor mount is employed, formed in one single piece of hard plastic material having radially spaced apart concentric rings with an annulus arranged therebetween. This annulus has a radial length exceeding its axial width and is joined to the outer ring by a plurality of ribs stiff in the radial direction. A number of radially extending arms connect the annulus to the inner ring at generally equally spaced apart intervals disposed intermediate the ribs. These arms, although stiff in the radial direction, have a cross-section area and sufficient length to permit limited angular movement in the manner of a spring, the arms tending to isolate torsional forces applied thereto. In this way, the motor mount, while providing resistance to radial forces, is particularly effective in absorbing torsional and axial stresses applied to it even though it is relatively inexpensive to produce and install.

By a further aspect of the present invention, the motor mount may be formed with a structure capable of preventing damage to it from sudden impact loads of relatively large magnitudes which may be imparted to the mount members of the arrangement. In one form, the ribs which support the annulus and outer ring in spaced relation may be made to extend inwardly, terminating in free ends disposed next to the outer wall of the inner ring. These elongated ribs, spaced angularly apart around the mount, tend to bottom on the outer wall of the inner ring upon the application to the mount of the sudden impact load having a radial component of predetermined magnitude, regardless of the angular direction of load application. The axial component of the sudden impact load may also be controlled by limiting the movement of the free ends of the ribs in an axial direction.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:

FIG. 1 is an end view of a small electric motor incorporating the preferred embodiment of my motor mounting arrangement;

FIG. 2 is a plan view showing the end of the motor revealed in FIG. 1;

FIG. 3 is a view taken along lines 3—3 in FIG. 1 to show details of the illustrated motor mounting arrangement;

Figure 4:
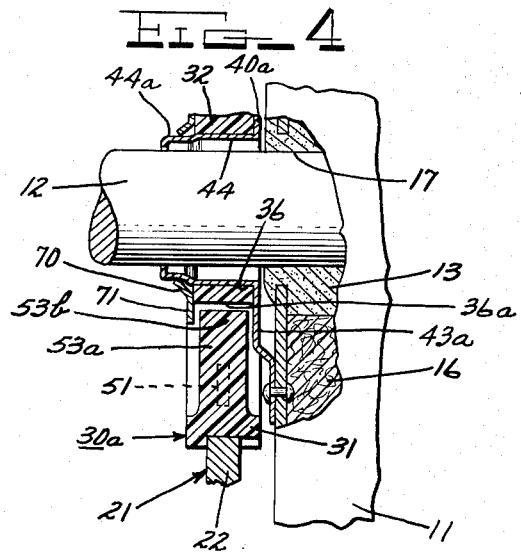
FIG. 4 is a partial side view, partly in section and broken away, of one end of the electric motor of FIG. 1, showing a modification of the motor mounting arrangement of FIGS. 1–3 which is effective in protecting damage to the mounting member from sudden impacts imparted to the unit.

By way of exemplification, in the drawings the preferred embodiment of my invention is illustrated in connection with a small alternating current induction electric motor 10 of the type commonly employed to drive electric typewriters and other equipment.

For simplicity of illustration, only one end of the motor and its supporting structure has been shown, but it is understood that the other end may be similar in construction. In the exemplification, the motor has a stator (not shown) suitably secured to a pair of end shields 11 which serve as the motor frame to journal each end of rotor shaft 12. As shown, end shield 11 is of the type disclosed and claimed in Patent No. 3,008,777 issued to L. W. Wightman and assigned to the same assignee as that of the present invention. Briefly described, end shield 11 is formed by a generally cup-shaped member stamped from a sheet of steel or other suitable material. With reference to FIG. 3, a sleeve bearing 13 of the permeable sintered type is utilized to journal each end of the shaft 12 and is firmly fastened to the cup-shaped member in any suitable manner. This may be accomplished by staking bearing end 14 to wall 15 of the end shield. A closed lubricant reservoir 16 for storing lubricant is carried by wall 15, on the surface disposed toward the motor interior, and radially through the bearing to its shaft accommodating bore 17, as dictated by the shaft lubricant requirements during operation of the motor.

The illustrated stationary motor support, for purposes of disclosing my invention is in the form of a conventional generally U-shaped mounting base 21, fabricated from steel or the like. The base is formed by a pair of spaced apart upright sections 22 integrally joined together at the lower end (as viewed in the drawings) by longitudinal section 23 having feet 24 for attaching the base to the equipment in which the motor is to be employed.

Referring now to my improved motor mounting arrangement for limiting the transmission of vibration and noise generating forces from the motor frame to base 21 of the exemplification seen in FIGS. 1-3 inclusive, I provide a motor mounting member generally indicated by the numeral 30. In the preferred embodiment, the motor mount is of single piece construction, integrally formed of molded thermoplastic material, such as "Delrin" commercially available from Du Pont or acetal resin, which has excellent fatigue and endurance qualities as well as other properties to be set forth hereinafter. As illustrated, mount 30 has radially spaced apart outer and inner concentric rings 31 and 32 with the outer ring being firmly attached to and locked onto the upright section 22 of base 21. By way of example, the outer ring may be fabricated with a suitable circumferential groove 33 which accommodates the edge of a complementary transverse recess 38 of the upright section. For reasons of ease in molding, groove 33 is defined by a number of angularly offset projections 34 and 35. A metal clamping strap 25, essentially an elongated strip of spring metal, is seated in the upper part of groove 33. The opposite ends 26 of the strip extend laterally from the groove and are secured, as by a screw and nut arrangement 27, to flanges 28 projecting outwardly from the outer margins of upright section 22 near recess 38. A pair of generally U-shaped notched tabs 29, adapted to cut into ring 31 on groove 33, may be provided in the strip as shown in FIGS. 1 and 2, in order to further insure the lack of relative angular movement between the strip, the base, and outer ring 31.

In the illustrated embodiment of FIGS. 1, 2, and 3, inner ring 32 of the mount, is assembled to the motor through the intermediary of hub member 40 stamped from sheet metal material which in turn is attached to the motor end shield. In particular, a flange 41 is connected by rivets 42 to the external surface of the end shield. At its inner end, flange 41 includes a circular shoulder 43 which is spaced from the end shield to permit room for accommodating staked end 14 of the bearing. Section 44 of the hub projects axially away from shoulder 43 and terminates at the outboard end in a radial flange 45 which acts as a dust seal around shaft 12. The inner ring is mounted to the hub by a number of equally spaced raised portions circumferentially provided to form recesses 36 extending axially across the inner wall of the ring for accommodating complementary projections 46 stamped into section 44 of the hub. These complementary recesses and projections cooperate to prevent relative angular movement of the inner ring on the hub while permitting ease in assembly since the inner ring may be readily slid onto hub section 44 before the motor is arranged in place on the stationary support. In its assembled position on the hub, the one end of inner ring 32 is in abutting relation to shoulder 43 which serves to position the mount axially on section 44.

Returning now to the illustrated construction of motor mount 30, a generally planar annular section or annulus 51 is provided in the space between the inner axial wall 31a of the outer ring 31 and the outer wall 32a of the inner ring 32, with the side faces of the annulus being perpendicular to the axis A of the mount. This axis is, of course, at least in theory, also the axis of rotation for motor shaft 12. The outer edge 52 of the annulus is held in position adjacent but spaced slightly from wall 31a of ring 31 by a number of angularly and equally spaced apart, relatively short, radial ribs 53, which for reasons of increasing the strength of the connection, preferably extend radially across the side faces of the annulus and terminate adjacent innermost edge 54 thereof. To conserve material without adversely affecting the strength of the connection, each side 56 of the individual ribs 53 may slope downwardly toward inner edge 54 of the annulus to a minimum axial width at that location from a point located near outer annulus edge 52 as best seen in FIG. 3.

It should be noted at this time that ribs 53 are located radially above the raised portions of the inner ring and include an axial depth greatly exceeding the width thereof. This has several benefits, for it provides the greatest possible angular distance between adjacent ribs for a given size mount, permitting the annulus to deflect with a very restrained spring-like motion between adjacent ribs in response to the application of axial forces. This tends to have an isolating effect on such forces. Then, too, the ribs will be furnished with a high degree of stiffness in both the axial and radial directions. To achieve the proper characteristics for annulus 51, it should be formed with a radial length in excess of its axial width, preferably several times as great and with a rectangular cross-section. Thus, annulus 51 will include rigidity in a radial plane while being slightly flexible in the axial direction.

Annulus 51 is united to the inner ring 32 of the mount at equally spaced intervals, intermediate ribs 53, by a plurality of radial, flexible or spring-like arms 61 corresponding in number to the ribs. These arms are joined at the one end 62 to the outer wall 32a of the inner ring and at the other end 63 are connected to the annulus, midway between adjacent ribs 53. The arms are dimensionally larger in the axial direction as compared with their width, the arms being highly resistant to radial and axial loads. The arms should also be of sufficient radial length to permit controlled and restrained relative angular motion between the inner ring and the annulus, the arms deflecting slightly in the manner akin to a spring upon the application thereto to torsional forces. This action has an isolating effect on pulsating torques generated in the motor during operation and tends to prevent these vibration and noise producing forces from being transmitted to the outer ring 31 of the mount and the stationary support. For reasons of stability and strength of the connection, arms 61 extend radially across the side faces of the annulus and terminate at annulus edge 52. In the same but reverse fashion of ribs 53, the sides 66 of the arm section extending across the annulus progressively decrease in axial width to a minimum dimension at annulus edge 52, adjacent outer ring wall 31a. It will be recognized from the above that the annulus could be positioned next to and joined by ribs 53 to the inner ring 32, with arms 61 connecting the outer ring 31 and annulus together. In other words, there could be a reversal of parts disposed between the inner and outer rings and still retain the benefits of my invention. However, this arrangement includes higher stresses than the preferred embodiment for a given size mount and applied forces to the mount of the same magnitudes.

I have found that in order to derive the maximum benefit from my invention with regard to the most favorable unit stress distribution in flexible arms 61 for a given torque or bending force applied thereto, each arm should be formed somewhat in the shape of an "hour-glass." That is to say, the configuration of each arm should be such that it has a maximum width and thickness (e.g., cross-section area) at arm ends 62, 63 where they are joined to the inner and outer rings 32 and 31 respectively. The arm preferably diminishes progressively in both the axial and radial directions, that is, in cross-section area, from those locations to a minimum cross-section in the vicinity of the center or centroidal section of the arm, indicated at 65. In this way, the unit stress in the flexible arms, resulting from the bending action on the arms as they are caused to oscillate slightly in an angular direction upon the application of torisonal forces, will approach a generally uniform distribution throughout the radial lengths of the arms. Although arms 61 may include parallel sides from arm end 62 to end 63 and thus provide a constant rectangular cross-section area throughout the radial length of the arm, the stress distribution therein would not nearly be as desirable as that achieved with the "hour-glass" cross-section.

The exact dimensional relationships of the component parts of the mount 30 are dependent upon many variables, such as the magnitude of the forces involved, the weight of the motor, among others. However, to obtain optimum results in the use of my invention relative to the maximum torsional and axial force isolation and the least possible vibration transmissibility through the mount, the radius "$r$" (FIG. 3) measured between the center of the mount "A" and the connection of spring arms to ring 32 preferably should be dimensionally less than one half the radial distance measured between the same axis and the inner circumferential wall 31a of the outer ring at the connection of rib 53. In addition, the inner ring 32 should be located as close to axis A as is practical under the circumstances, taking into consideration (among other things) the ease in manufacture and assembly of the component parts, and the requirement for a secure amount in which the inner ring is held firmly in place on the motor. This allows the stationary inner ring of the mount to be disposed as close as possible to the center of mass rotation where, at least theoretically, the torsional movement produced by the motor approaches zero. The foregoing relationships also permit the proper radial proportioning of both flexible arms 61 and the intermediate annulus 51 to achieve the desired spring or flexing actions in response to applied bending and axial forces for a given application while still providing the requisite radial strength or rigidity property for the mount.

Figure 5:
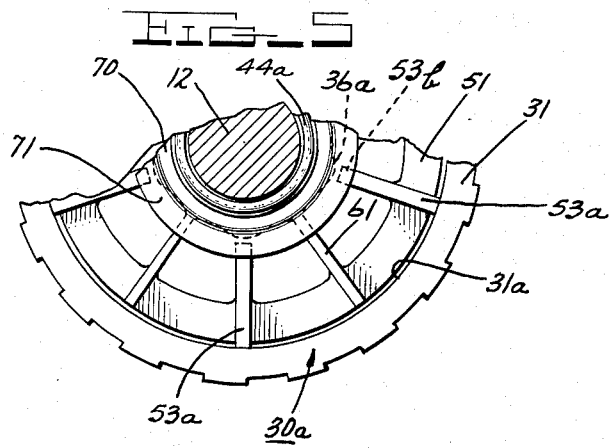
FIG. 5 is a partial end view of the arrangement seen in FIG. 4.

For those situations in which the motor and its support, that is, mounting members 30 and the associated mounting base 21 of the exemplification, may be subjected to sudden impact loads having radial and axial force components of relatively large magnitudes, a mounting arrangement such as that shown in FIGS. 4 and 5 may be provided. One such impact load situation might occur, for instance, where the motor and its support undergo considerable handling and shipping after the motor and base components have been assembled together. This creates an increased opportunity or possibility for accidental dropping or other mishandling of the assembled unit which in turn may produce a sudden impact load on mounting members 30 of greater magnitude than they would otherwise experience. The arrangement revealed by FIGS. 4 and 5 will prevent damage to mounting members 30 from the sudden load imparted to the unit under such circumstances.

In FIGS. 4 and 5, like parts already described in connection with FIGS. 1-3 inclusive, are identified by like reference numerals. The motor mounting member of the latter two figures, denoted by reference 30a, is essentially the same as that described for the embodiment of the first three figures, differentiating therefrom principally in the provision of integrally formed means for preventing damage to both outer ring 31 and annulus 51 which might otherwise occur from a large impact load transmitted to these parts. More specifically, in order to control the effect of radial impact forces on mounting member 30a, regardless of direction of original application to the unit, the ribs which connect annulus 51 and outer ring 31 together, are molded into the form best seen in FIG. 4, the ribs being indicated by reference 53a in that figure. Each rib projects inwardly from annulus 51 and terminates in a free end 53b located next to but slightly spaced from raised outer wall 36a of inner ring 32. For ease in injection molding and other reasons to become more apparent below, ribs 53a preferably have a somewhat constant rectangular cross-section configuration throughout their radial lengths to provide adequate stiffness in the radial direction.

The radial distance between free end 53b of each rib and the associated wall 36a of the inner ring (the size being slightly exaggerated in FIGS. 4 and 5) should be made as small as possible so that very limited inward movement of annulus 51, outer ring 31, and ribs 53a is allowed before end 53b bottoms on wall 36a which acts as a stop to prevent further inward movement of the parts beyond the breaking point of the material used for member 30a. On the other hand, the space under consideration should be of sufficient size to permit unimpeded relative motion between rib end 53b and wall 36a when ribs 53a move in response to the maximum instantaneous radial loads imparted to the mount under normal operating conditions. By way of example, for many fractional horsepower motor applications used to drive belts, a distance of .020–.030 inch (twenty-thirty mils) should be sufficient. In addition, this amount would permit the use of conventional two-piece molds in the formation of the mount.

To control the axial force component of sudden impact loads, axial movement of the free ends 53b of the ribs may also be restrained. This may be inexpensively achieved as seen in FIG. 4. By way of example, one end of the motor may be provided with a hub member 40a having a circular shoulder 43a which extends radially beyond the termination of rib end 53b, in axially spaced relation thereto. With this radial overlap of parts, the shoulder limits axial movement toward the right in the drawings of ribs 53a (and consequently, the axial motion in that direction of the outer ring and annulus) in response to the axial force component transmitted to the mount. At the other or outboard side of the mount, a generally frusto-conical shaped lock nut 70 or the like, having a radial flange 71, which abuts against the adjacent end of inner ring 32 and overlaps with rib ends 53b, is used to limit movement of the ribs toward the left in the drawing. An axial extension 44a of hub section 44 which accommodates inner ring 32, frictionally engages the lock nut 70 to support it with the desired rigidity or firmness. The lock nut also functions as a retainer and augments the support provided for member 30a by hub section 44. By furnishing a small axial space between the respective edges of rib ends 53b and the associated limits (e.g., shoulder 43a and flange 71), unimpeded movement in response to normal maximum thrust loads of rib ends 53b is allowed by the arrangement. The ideal dimensions of the axial spaces will, of course, vary from one type of application to another.

It should be recognized, of course, that for situations involving sudden impact loads of the highest order, both ends of the motor may be mounted in the manner shown by FIGS. 4 and 5. For other situations in which member 30a is employed at each end of the motor, the axial force components in both directions may be readily controlled by utilizing only shoulder 43a at both ends of the motor, or in the alternative, only a pair of nuts 70, or the equivalent of either approach.

It will be observed from the foregoing that the present invention provides a motor mounting arrangement which includes a relatively high degree of radial stiffness, yet is effective in isolating and limiting the transmission of torsional and axial stresses and 120 cycle forces to the supporting structure. In addition, the arrangement may be manufactured and installed efficiently and economically as compared to previous constructions known to me.

While in accordance with the patent statutes, I have described what at present in considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A single piece motor mount comprising radially spaced apart concentric inner and outer rings, an annular section arranged between said rings and having a radial length which exceeds the axial width thereof, a plurality of ribs joining said annular section to said outer ring, said ribs being rigid in a radial direction, a plurality of angularly spaced apart generally radial arms joining said annular section and inner ring together, said arms being rigid in the axial direction with the portion of said arms extending between said annular section and said inner ring tending to isolate torsional forces applied thereto.

2. A single piece motor mount formed of plastic material comprising radially spaced apart concentric inner and outer rings, an annular section arranged between said rings, a plurality of ribs joining said annular section to one of said rings, said ribs being rigid in an axial direction with the portion of said annular section disposed between adjacent ribs tending to isolate axial forces applied thereto, a plurality of angularly spaced apart generally radial arms joining said annular section and the other ring together at locations spaced from the respective connections of the ribs with said annular section, said arms being rigid in the axial direction with the portion of said arms extending between said annular section and said other ring having the characteristic of a spring and tending to isolate torsional forces applied thereto.

3. A motor mount comprising radially spaced apart concentric inner and outer rings, an annulus arranged between said rings and having a radial length which exceeds the axial width thereof, a plurality of ribs joining said annulus to one of said rings, a plurality of angularly spaced apart generally radial arms joining said annulus to the other of said rings at locations spaced from said ribs, said arms being rigid in the axial direction and tending to isolate torsional forces applied thereto.

4. The motor mount of claim 3 in which the cross-section area of each arm is greater at the respective arm connections with each of said other ring and said annulus than near the radial center portion of the arm.

5. The motor mount of claim 3 in which said ribs and said arms each have extensions projecting substantially across the radial length of said annulus to augment the strength of the respective connections therewith.

6. A motor mount comprising radially spaced apart concentric inner and outer rings, an annulus arranged between said rings, a plurality of ribs joining said annulus to said outer ring, a plurality of angularly spaced apart generally radial arms joining said annulus and inner ring together at locations angularly spaced from said ribs, said arms being rigid in the axial direction and tending to isolate torsional forces applied thereto, the radial distance between the axis of the mount and the respective connections of the arms with the inner ring being less than half that between the same axis and the respective connections of the ribs with the outer ring.

7. A single piece motor mount formed of plastic material comprising radially spaced apart concentric inner and outer rings, an annular section arranged between said rings and having a radial length which exceeds the axial width thereof; a plurality of generally radially extending ribs joining said annular section to said outer ring at generally equal intervals; said ribs each having an axial depth exceeding the width thereof and being rigid in an axial direction, with the portion of said annular section disposed between adjacent ribs tending to isolate axial forces applied thereto; a plurality of angularly spaced apart generally radial arms joining said annular section and inner ring together at locations intermediate said ribs; said arms each having a greater axial depth than the width thereof at any given distance from the axis of the mount, with the portion of each arm extending between said annular section and inner ring having the general characteristics of a spring and tending to isolate torsional forces applied thereto.

8. The motor mount of claim 7 in which at least some of said ribs project inwardly from said outer ring entirely across said annular section and have free ends terminating adjacent but in slightly spaced relation to the outer wall of said inner ring, said free ends and inner ring together preventing inward radial movement of both said annular section and said outer ring beyond a predetermined amount, with said free ends being capable of being restrained in an axial direction to control the axial movement of said ribs.

9. The motor mount of claim 3 in which at least some of said ribs project inwardly from said one ring entirely across said annular section and have free ends terminating adjacent but in slightly spaced relation to the wall of the other ring, said free ends and other ring together preventing radial movement of the rib beyond a predetermined amount.

10. A motor mount comprising radial spaced apart concentric inner and outer rings with an annulus arranged in spaced relation with each of said rings, first means joining said annulus to one of said rings at angularly spaced apart locations, second means joining said annulus to the other ring at locations intermediate the locations of said first means, one of said means forming a number of annulus portions deflectable in the axial direction relative to each of said rings in response to axial forces applied thereto for isolating such forces, and means disposed at angularly spaced apart positions extending between said other ring and said annulus for preventing movement of said annulus toward said other ring beyond a predetermined amount.

References Cited by the Examiner

UNITED STATES PATENTS

| | | | |
|---|---|---|---|
| 2,178,077 | 10/1939 | Loftis | 248—26 |
| 2,936,141 | 5/1960 | Rapata | 248—26 |
| 3,065,941 | 11/1962 | Loftis | 248—26 |

CLAUDE A. LE ROY, *Primary Examiner.*

J. PETO, *Assistant Examiner.*